Aug. 20, 1935.  H. E. MORTON  2,011,725
FLASH REMOVING MACHINE
Filed Nov. 9, 1934   4 Sheets-Sheet 1

INVENTOR
Henry E. Morton,
BY
ATTORNEYS

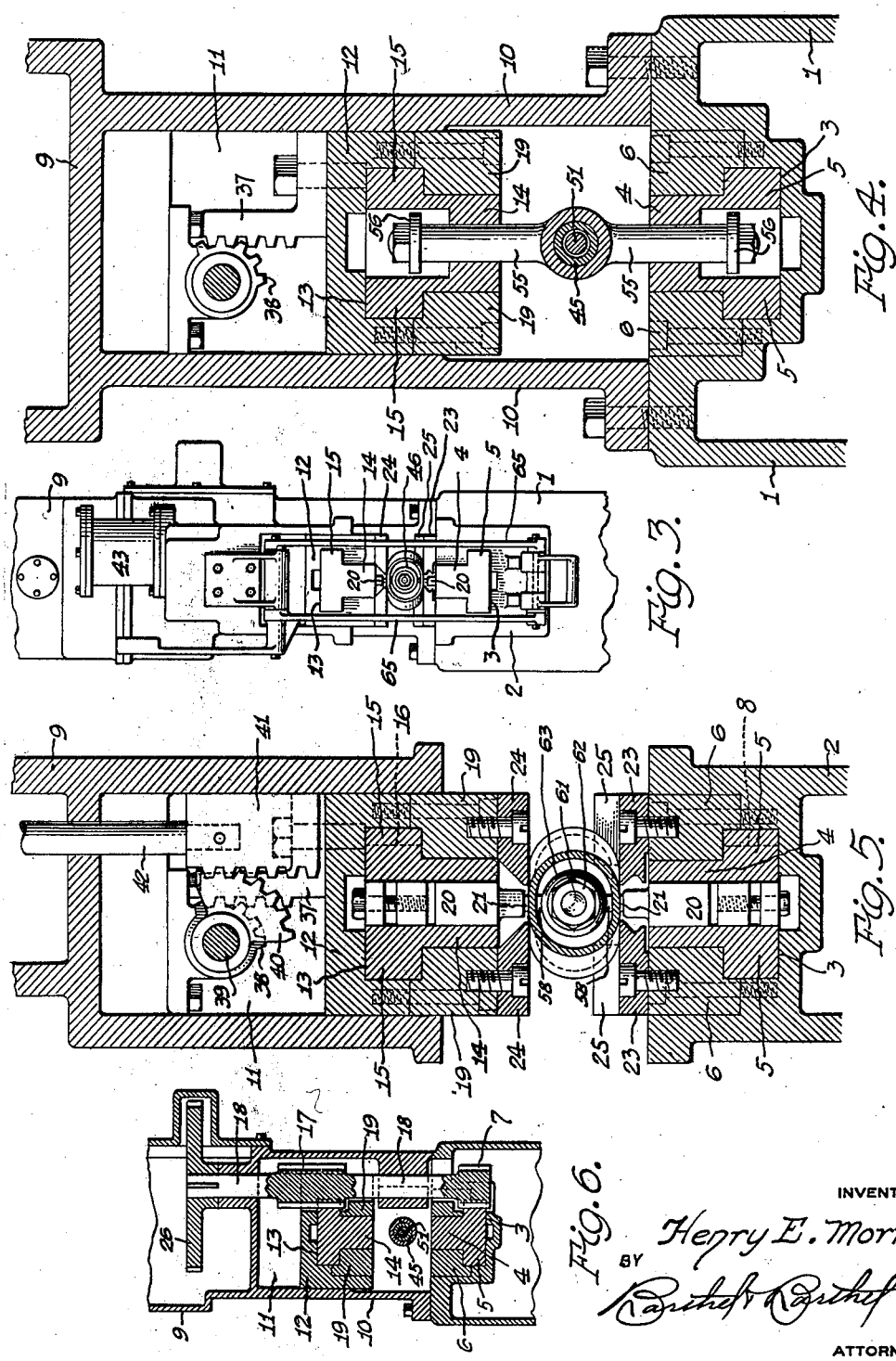

Aug. 20, 1935.  H. E. MORTON  2,011,725
FLASH REMOVING MACHINE
Filed Nov. 9, 1934   4 Sheets-Sheet 3
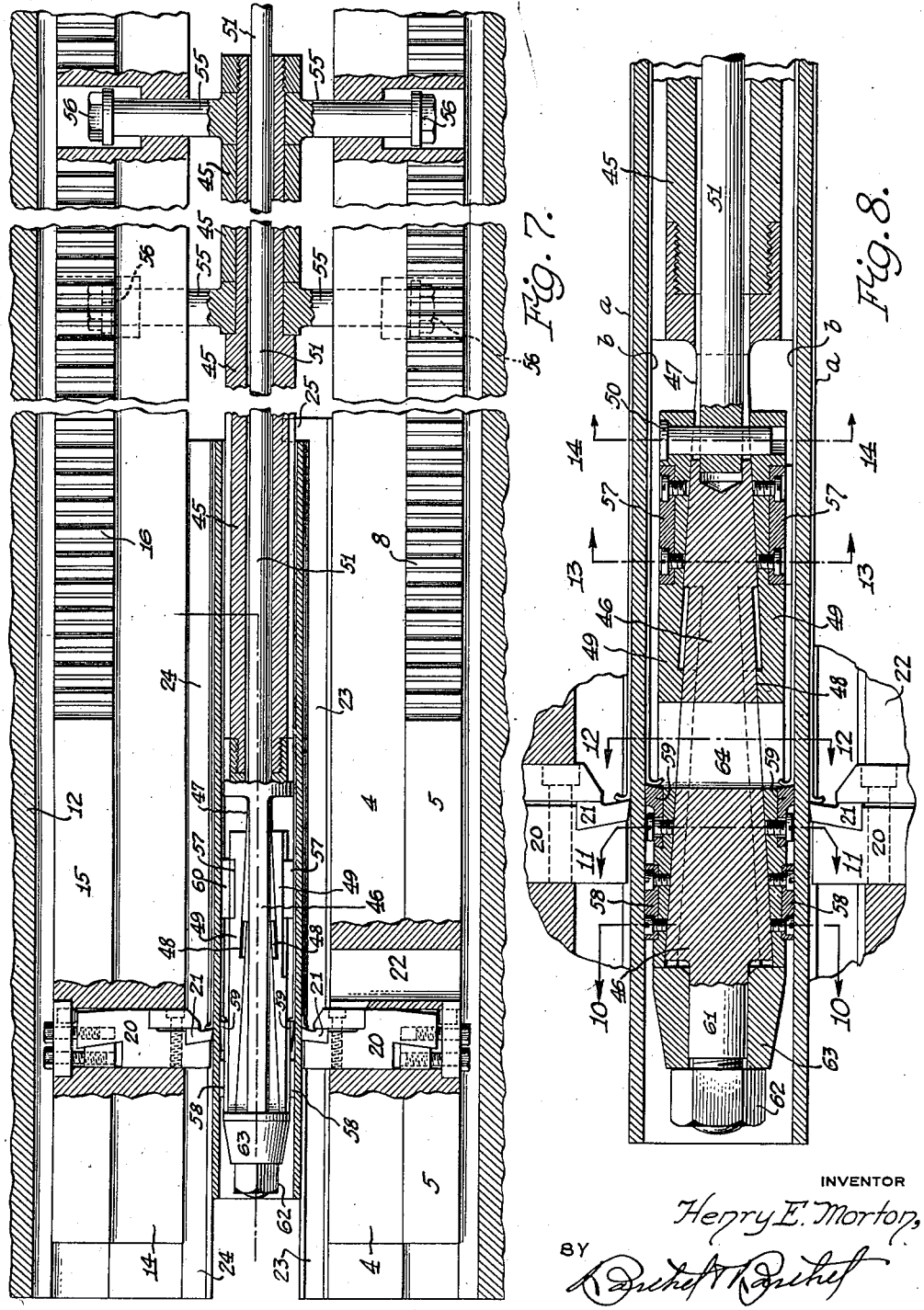
INVENTOR
Henry E. Morton,
BY
ATTORNEYS

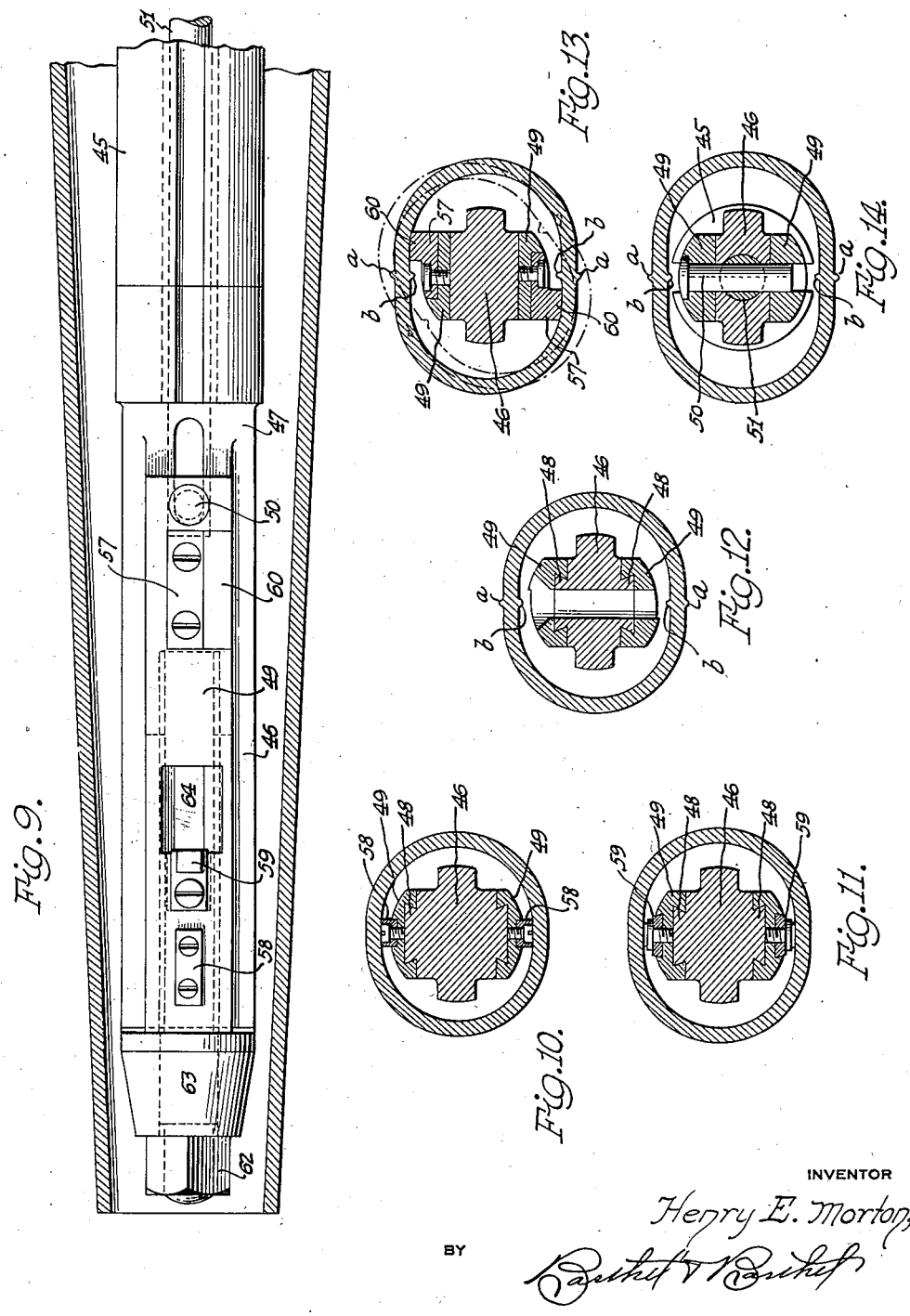

Patented Aug. 20, 1935

2,011,725

UNITED STATES PATENT OFFICE 2,011,725

FLASH REMOVING MACHINE

Henry E. Morton, Muskegon Heights, Mich.

Application November 9, 1934, Serial No. 752,310

15 Claims. (Cl. 90—38)

This invention relates to a machine for removing the flash from a seam of an electrically welded member, and more particularly to a machine especially adapted for removing both external and internal flash from tubular members of extended length which are of too small a diameter to permit the insertion therein of the tool carrying member of any known machine suitable for doing this work.

An object of the present invention is to provide a machine for the purpose with a tool carrying member which is adapted to be inserted within tubular work of comparatively small diameter and extended length, and to provide means carried by said tool carrying member adapted to be adjusted into contact with opposed walls of the work to provide internal support for said walls, a further object being an arrangement whereby such adjustment of said means into contact with said wall or walls will effect the proper positioning of a tool or tools to remove flash even with the inner surface of said wall or walls.

A further object is to provide a machine for the purpose having an external longitudinally movable tool carrying member or members for removing the external flash from the longitudinal seam or seams of the work, and including means for adjusting one of said external members laterally toward and from the work to permit the ready insertion of the work and to bring said tool or tools carried thereby, into operative position.

It is also an object to provide means for clamping opposed walls of the work and putting the same under heavy pressure throughout their length and adjacent a longitudinal seam or seams of the work, to straighten these walls so that the tools carried by both external and internal tool carrying members, will remove the flash, even with the surface of these walls throughout the length of the work; and a further object is to provide power means for effecting such clamping action and heavy pressure upon the work, and for moving said external tool carrying member laterally.

A further object is to provide means for simultaneously reciprocating said external and internal tool carrying members to remove simultaneously, both the internal and external flash from the work while the work is so clamped and held, and to provide a simple, compact and efficient arrangement of rigid construction which is rapid and automatic in operation, and embodies means for effectually taking care of the chips removed from the work by both external and internal tools.

With the above and other ends in view, the invention consists in the matters hereinafter set forth and more particularly pointed out in the appended claims, reference being had to the accompanying drawings, in which;

Fig. 3 is an enlarged front end elevation of Figure 1;

Figure 1:
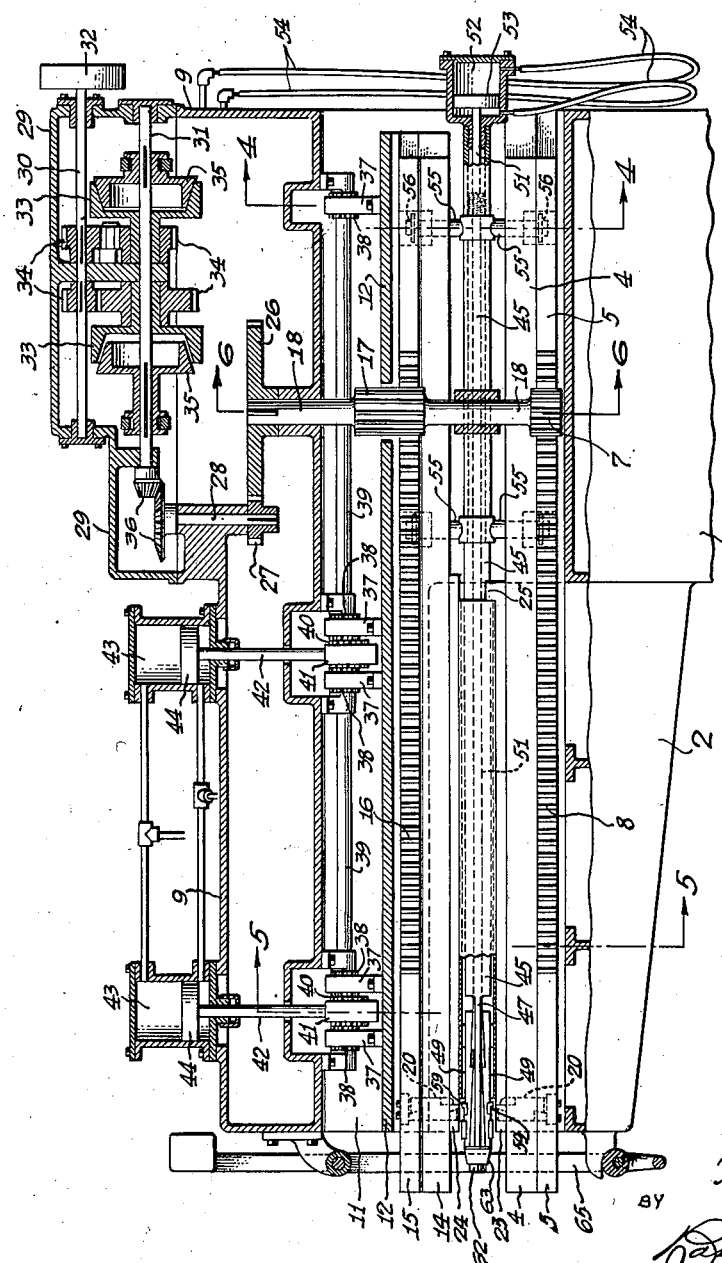
Figure 1 is a longitudinal vertical section through a machine illustrative of an embodiment of the present invention.

Figs. 4, 5 and 6 are enlarged transverse sections substantially upon the lines 4—4, 5—5 and 6—6 of Figure 1;

Fig. 7 is a longitudinal sectional detail of internal and external tool carrying members and adjacent parts of the machine, the figure being broken away to shorten its over-all length;

Fig. 8 is a longitudinal sectional detail of the head end of the internal tool carrying member shown in Figure 7, and showing the same in operative position within a tube, and showing external tools in operative position;

Fig. 9 is a detail showing the tube shown in Fig. 8 and in section at right angles to that of said figure, the internal tool carrying member being shown in elevation, and Figs. 10, 11, 12, 13 and 14 are transverse sections substantially upon the lines 10—10, 11—11, 12—12, 13—13 and 14—14 of Figure 8.

Figure 2:
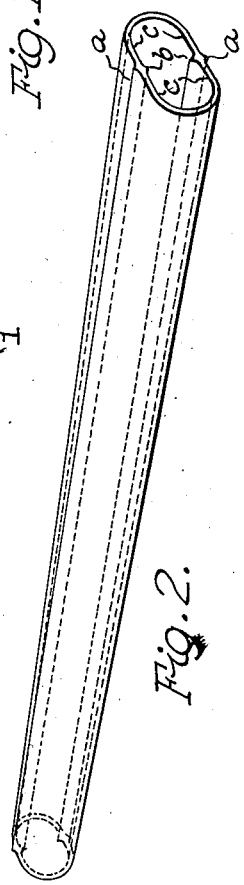
Fig. 2 is a perspective view of an electrically welded tube illustrative of one form of work from which the flash is adapted to be removed by the present invention.

In Figure 2 is illustrated a tube adapted to be operated upon by the present machine to remove the ridges $a$, $b$ formed by the extruded flash in electrically welding together, the edges of the two formed sheet metal strips, the seams thus formed, extending longitudinally and centrally of the opposed parallel walls or sides $c$ of the tube, in the form shown, the tube being of oval form in cross section and tapered longitudinally, but it will be understood that this machine is adapted to remove the flash from a wall or walls of tubular work of different forms, this machine being especially adapted for removing both external and internal flash from the seam of a tubular member of comparatively limited diameter and extended length where it would be impossible to employ known machines having opposed tool carrying rams, due to the fact that it would be impossible to insert one of the rams within a tubular member of this character and also to the construction of such machines. These tubes usually have a comparatively thin wall and therefor, in removing the flash therefrom it is necessary to support or brace this wall internally to prevent its collapse or injury during the operation. Further, this wall often becomes distorted during the forming and welding operations and it is most desirable that it be straightened so that the tool or tools will remove the flash even with the surface of the wall throughout the length of the tube.

As shown in the drawings, the machine includes a suitable supporting pedestal 1 having a horizontally extending arm 2, and the upper end of this pedestal and the upper side of said arm are formed with a continuous way 3 to receive a longitudinally reciprocable ram or bar 4 having laterally projecting longitudinal side ribs 5, and this bar is secured within said way by means of filler bars or strips 6 which are bolted within said way at each side of said bar 4 and overlie the shoulders on said bar formed by the ribs 5, the said filler strips and bar or ram together filling the open top of the way, flush with the upper surfaces of the pedestal and arm, said way 3 being open at its ends so that the ram 4 may be projected therefrom when said bar is reciprocated by means of a pinion 7 in engagement with rack teeth 8 formed on one of the ribs 5 of the bar, throughout a portion of its length.

An upper casing, indicated as a whole by the numeral 9, has downwardly extending spaced apart parallel side walls 10 the lower ends of which, opposite the upper end of the pedestal 1 are rigidly bolted, as shown in Fig. 4, to said pedestal to support and secure said casing in place upon said pedestal with that portion of said walls opposite the upper side of the arm 2, spaced therefrom. The space between the adjacent sides of said walls 10 forms a chamber 11 open at its ends at the ends of the machine and at its lower side opposite the way 3, said chamber being co-extensive in length, with the length of said way 3 and of substantially the same width as the width of said way at its widest part.

Arranged to slide vertically within the open lower side of this chamber 11, is a carrier bar 12 of a length substantially equal to that of said chamber, this carrier being formed with a longitudinal way 13 throughout its length in the lower side thereof to receive a longitudinally reciprocative ram or bar 14 corresponding to the ram 4 and having side ribs 15 like the ribs 5, one of which ribs is formed with rack teeth 16 to engage an elongated pinion 17 on the same vertical shaft 18 upon which the pinion 7 is secured. The bar 14 is secured in its way in the carrier bar 12, by filler bars or strips 9 similar to the fillers 6, and each bar 4 and 14 is formed near its forward end with a transverse opening in which is adjustably secured a tool holder 20 of any suitable form, each carrying a tool 21 to remove the external flash a from the work. In the lower ram 4 adjacent the opening for its tool holder, is a transverse opening 22 (Fig. 7) to receive the chips removed by the tool so that these chips may drop through this opening and not clog the space between the work and ram and work into the way for the ram, causing friction and wear.

Secured upon the upper or exposed faces of the filler bars 6 for holding the lower ram 4 in its way, are two work engaging bars or strips 23, one secured upon each of said fillers by means of screws, or in any other suitable manner, with the adjacent edges of said work engaging bars spaced apart sufficiently to permit the tool holder 20 and tool 21 to extend upward therebetween with said tool in position to engage and remove the flash from the exterior of the work; and similar work engaging bars 24 are secured in a like manner upon the lower faces of the fillers 19 which hold the upper ram 14 in its way, these bars 23 and 24 being each formed with an angular inner edge to engage the work adjacent each side of the longitudinal seams thereof at the upper and lower sides of the work. At the inner end of each of the bars 23, each is provided with an abutment lug 25 adapted to engage the inner end of the work and prevent longitudinal movement of the work upon said bars under the strain imposed thereon by the tools of the rams in removing the flash a from both upper and lower sides of the work when these rams are simultaneously moved inward by the turning of the vertical drive shaft 18 by means of a large spur gear 26 upon the upper end of said shaft, which gear is in turn driven by a small gear 27 on the lower end of a second vertical shaft 28 mounted in a suitable bearing at the top of the casing 9.

A supplemental casing 29 is secured upon the top of the casing 9 and is provided with bearings therein for horizontally extending parallel shafts 30 and 31, the shaft 30 being a power shaft driven in any suitable manner, as by a pulley 32 upon its outer end, and said shaft 31 being a clutch shaft carrying a pair of oppositely disposed cone cups 33 which receive motion from said power shaft by means of two sets of spur gears 34, said shaft 31 having slidably mounted thereon to turn therewith, cone clutches 35 to engage within the cups 33, whereby motion is transmitted from said power shaft by one of said clutches to drive the clutch shaft 31 in one direction and by the other of said clutches to drive said shaft in an opposite direction, motion being transmitted from the inner end of said clutch shaft to said vertical shaft 28 by means of beveled gears 36. Therefore said rams 4 and 14 are reciprocated simultaneously in the desired direction, by a shifting of the clutches 35.

Suitable power operated means is provided for moving the carrier bar 12 vertically within the chamber 11 of the casing 9, which chamber forms a guideway for such carrier during such movement, and such means may comprise, as shown, a plurality of rack bars 37 secured upon the upper side of the said carrier bar 12 and extending upward therefrom into engagement with pinions 38, one for each rack, secured upon a horizontal shaft 39 mounted in suitable bearings on the casing within said chamber and extending parallel with the said carrier 12. On this shaft 39 are two or more pinions 40 engaged by racks 41 on the lower ends of plungers 42 extending upward through stuffing boxes at the lower ends of cylinders 43 mounted on the top of the casing 9 and within which cylinders are pistons 44 upon the upper ends of said plungers 42. Any suitable means may be provided for admitting fluid under pressure to and discharging the same from said cylinders at opposite sides of said pistons to cause a simultaneous reciprocation thereof and the transmission of motion to raise or lower said carrier 12 and its ram 14 carried thereby, the pinion 17 being elongated to permit of such movement of said ram, and as the work engaging bars 24 are carried by said carrier 12, these bars are brought into engagement with the work with a heavy pressure to firmly clamp it between these bars and the bars 23 which engage and support the work at its lower side.

The tubular piece from which the flash is to be removed, usually has a wall which is comparatively thin and therefore this wall must be internally supported or otherwise this heavy clamping action imposed thereon by the downward movement of the carrier 12 would collapse this wall. Further, to remove the internal flash b from the work, a tool carrying ram member must be provided which may be entered within the tubular work and which may be reciprocated longitudinally while the work is so held, and further, this internal ram must be provided with means whereby it may be, in effect, expanded within the work to bring suitable means carried thereby into contact with opposed walls of the work to support the same against collapse, and also to bring the cutting tools carried thereby into position to remove the interior flash.

Such an internal ram suitable for the purpose is shown in detail in Figs. 8-14 of the accompanying drawings and comprises a tubular body 45 and a head portion 46 connected to the end of the body by a neck portion 47, said head 46 being tapered longitudinally from its free end toward said neck at the upper and lower sides of said head and these sides are each formed with a central longitudinal rib 48 having undercut sides, said ribs being adapted to engage within longitudinal grooves in shoes 49, said grooves having undercut sides to receive the undercut sides of said ribs and hold said shoes in place upon said head and permit free longitudinal movement of said shoes thereon.

To move said shoes longitudinally, relative to said head, these shoes are connected, adjacent the connecting neck portions 47 between head and body, by a transverse pin 50 passing through openings in the ends of said shoes and through an opening in the end of an operating rod 51 passing through the tubular body 45 and projecting through the rear end of said body which is provided with a cylinder 52 (see Fig. 1) and within which cylinder, is a piston 53 on the end of said rod. Any suitable means, such as lengths of hose 54, may be provided to conduct a fluid under pressure from a suitable source, to said cylinder at opposite sides of said piston, whereby the piston may be actuated to move said rod and adjust said shoes upon said head 46, said hose permitting of free longitudinal reciprocation of said body 45 with the two rams 4 and 14, said body being connected to said rams by two pairs of arms 55 rigidly secured to said body and extending laterally therefrom in opposite directions, the upwardly extending arms to engage within openings in the ram 14 and the downwardly extending arms, within openings in the ram 4, heads 56 on the ends of said arms preventing disengagement of said arms from said rams but arranged to permit longitudinal movement of said arms within the openings in said rams, so that said internal ram may move laterally relative to said rams, and said ram 14 may move with its carrier 12, toward and from said internal ram.

Secured in any suitable manner within recesses in the outer faces of the shoes 49, are blocks 57 and 58 to engage the inner surface of the wall of the work upon movement of said shoes up the inclined sides of the head, which movement causes, in effect, a lateral expansion of the head and brings these blocks into firm contact with opposed walls of the work, the blocks 57 being located adjacent the inner ends of the shoes in advance of the cutting tools 59 which are secured in any suitable manner within recesses in said shoes to remove the internal flash during the inward stroke of this internal ram, said blocks 57 being formed, each with an offset lug 60 (see Fig. 13) to so contact the inner surface of the wall or walls of the work, adjacent and laterally of the seams thereof. The blocks 58 are located rearwardly of the tools 59 in the direction of the working stroke of the ram and have plain outer faces to engage the work opposite the seams after the cutting tools have removed the flash therefrom. To adjustably limit this endwise movement of said shoes up the inclined sides of the head and thus limit the outward lateral movement of said shoes and consequently the adjustment of the tools 59 toward the work so that said tools will cut to the proper depth to remove the flash even with the inner surface of the work, said head is formed with an end stem 61 which is screwthreaded to receive a nut 62 to engage a collar 63 on said stem, said collar being adapted to engage the adjacent ends of the shoes 49 and said nut being adapted to adjust said collar on said stem to vary the movement of said shoes up the inclined sides of the head and thus vary the outward or lateral adjustment of the tools toward the work.

To provide a space to receive the chips of the internal flash, which chips would otherwise clog the space between the said shoes and walls of the work ahead of the cutting tools 59, a transverse opening 64 is formed in the head 46 and shoes 49 adjacent and just ahead of these cutting tools, and to guard against any springing away from each other of the separated and overhanging or free ends of the arm 2 and casing 9 under the heavy strains imposed thereon by the operation of cutting the external flash from the work and by the clamping of the work by the downward movement of the carrier 12, a clamping yoke 65 is pivotally attached to the forward end of said casing, to be swung into engagement with a suitable lug on the end of the arm 2.

Before inserting the work, the two rams will be run forward substantially to the position shown in Fig. 1, the carrier 12 will be raised to move the ram 14 away from the internal ram, and the shoes 49 on the head of said internal ram will be moved endwise to move the cutting tools 59 and blocks 57 and 58 inward so that the tubular work may be readily slipped endwise over the internal ram. If the work be of oval form in cross section, as shown, this positioning of the work is further facilitated as the tube may be slipped over the internal ram in the position indicated in dotted lines in Fig. 13 and then turned to the position shown in full lines to bring its seams into proper relation to the cutting tools on all of the rams. When the work is in proper position and resting upon the work engaging bars 23 with the seam of its lower side between the adjacent edges of said bars, the carrier 12 will then be lowered to bring the adjacent edge portions of its bars 24 into contact with the work at each side of the seam of the upper wall of the work, the internal ram head, at the same time being expanded within the work to bring its blocks 57 and 58 into contact with the inner surface of the wall adjacent these seams and thus support said wall internally to prevent collapse thereof under the heavy clamping strain imposed thereon by the carrier 12. The work is thus properly positioned and held to take the cut of both external and internal tools and at the same time, the wall or walls of the work are straightened by such pressure and clamping action so that both external and internal flash will be removed evenly with the surface of the wall throughout the length of the work, the depth of cut of the external tools being determined by the contact of the bars 23 and 24 with the outer surface of the wall adjacent the seams, and the cut of the internal tools being determined by the contact of the blocks 57 and 58 with the inner surface of the wall.

Obviously any suitable power means may be provided for reciprocating the rams or for moving the upper ram and its carrier upwardly. Further, it will be understood that work of other than the form shown may be operated upon by the present machine and this work may be of other than tubular form and may have one or more welded seams from which the flash is to be removed. It will also be understood that changes may be made in the construction and arrangement of parts, within the scope of the appended claims, without departing from the spirit of the invention, and such changes are contemplated.

Having thus fully described my invention, what I claim is:—

1. In a machine for removing the flash from an electrically welded seam extending longitudinally of the work, the combination of a ram reciprocable longitudinally of the work and having a cutting tool to remove the flash from one side of the work, a ram reciprocable longitudinally of the work and having a cutting tool to remove the flash from other side of the work, means for reciprocating said rams, and means for moving one of said rams laterally toward and from the work to separate said rams to permit the insertion of the work therebetween.

2. In a machine for removing the flash from an electrically welded seam extending longitudinally of the work, the combination of a pair of rams reciprocable longitudinally of the work and each having a cutting tool to remove flash from the work, means for reciprocating said rams, a member adjacent each ram for engaging the work, and means for moving one of said rams and said member adjacent thereto, laterally toward and from the work to clamp the work between said work engaging members.

3. In a machine for removing the flash from an electrically welded seam extending longitudinally of the work, the combination of horizontally disposed reciprocable rams having cutting tools for removing flash from opposite sides of the work, means for reciprocating said rams, means for supporting the work throughout its length at the lower side thereof, means for engaging the work at its upper side adjacent the seam of the work throughout the length thereof, and means for moving said work engaging means toward the work to clamp the same between said work engaging means and said work supporting means.

4. In a machine for removing the flash from an electrically welded longitudinal seam of tubular work, the combination of means for removing the external flash from a seam of the work, means for externally supporting the work at the side thereof opposite said seam, a member engageable within said tubular work, and means for expanding said member within said work to bring the same into contact with the interior surface of the work and support the wall thereof.

5. In a machine for removing external portions from tubular work of limited diameter and extended length, the combination of means for removing said external portions from the work, a longitudinally reciprocable member to enter said tubular work and having a cutting tool to remove internal portions of the wall of the work, means for reciprocating said member, and means for expanding said member within the work to bring the same into contact with the wall of said work and bring said tool into operative position.

6. A machine as set forth in claim 8 and wherein said means for expanding said internal longitudinally reciprocable member includes members carried by said member and movable laterally thereof into contact with opposed portions of the interior surface of the work, and means for moving said members.

7. In a machine for removing external portions of tubular work of limited diameter and extended length, the combination of external means for removing said external portions from the work, external means movable toward the work to engage the wall thereof and put pressure thereon, external means for removing portions from the internal surface of said wall and having a cutting tool, means for reciprocating said internal means longitudinally of said work, and means for expanding said internal means within the work to bring the same into contact with the wall of the work and support the same against the pressure imposed thereon by said external means movable toward the work.

8. In a machine for removing the flash from an electrically welded longitudinal seam of tubular work of limited diameter and extended length, the combination of a longitudinally reciprocable ram having a cutting tool to remove the external flash from said seam, a carrier member within which said ram is mounted for reciprocation therein, means for reciprocating said ram, means for moving said carrier member and ram toward one side of the work, supporting means engaging the opposite side of the work to support the same, internal means for insertion in the work and having a cutting tool to remove internal flash from the seam, and means for expanding said internal means to bring the same into contact with the wall of the work opposite said carrier and said supporting means.

9. In a machine for removing portions of the wall of tubular work of limited diameter and extended length, the combination of a pair of longitudinally reciprocable spaced apart external rams each having a cutting tool to remove the external portions of the work, means for guiding each of said rams, an internal longitudinally reciprocable ram to project into the work and having cutting tools to remove internal portions from the wall of the work, and means for reciprocating said rams.

10. In a machine for removing portions of the wall of tubular work of limited diameter and extended length, the combination of a pair of external longitudinally reciprocable spaced apart rams each having a cutting tool to remove external portions of the work, means for holding the work between said rams with its length extending in the direction of the length of said rams, an internal longitudinally reciprocable ram to project into the work and guided thereby and having cutting tools to remove internal portions from the wall of the work, and means for reciprocating said rams.

11. In a machine as set forth in claim 10 and wherein said internal ram includes an expansible head, and means extending from said head through said ram to the end thereof for effecting expansion of said head.

12. In a machine for removing the flash from longitudinal electrically welded seams in opposite sides of tubular work of limited diameter and extended length, the combination of a pair of horizontally disposed longitudinally reciprocable spaced apart rams each having a cutting tool to remove external flash from a seam of the work, means engaging the work adjacent each side of the seam in the lower side thereof to support the work in a horizontal position, longitudinally of and between the rams of said pair, a carrier member having a longitudinal way within which said upper of said pair of rams is reciprocable, means on said carrier to engage the work adjacent the seam in the upper side thereof, means for moving said carrier to bring said means thereon into engagement with the work and to move said ram carried thereby, laterally toward and from the work, an internal ram to project longitudinally within the work and having cutting tools to remove the internal flash, means for expanding said internal ram within the work to engage and support the wall thereof, and means for reciprocating said rams.

13. In a machine for removing portions of the wall of tubular work, the combination of means reciprocable longitudinally of the work for removing exterior portions of said wall, an internal ram to project longitudinally into and through the work and comprising a body of a length greater than that of the work, a head on one end of said body having a tool to remove portions of the inner side of the wall of the work and having members movable laterally of said head into contact with the inner surface of the work, means extending from said head through said body for moving said members on said head, and means for reciprocating said internal ram.

14. In a machine for removing portions of the exterior and interior surfaces of a tubular member of limited diameter and extended length, the combination of a pair of exterior longitudinally reciprocable rams arranged in parallel relation and of greater length than that of the work, means for supporting and holding the work between said rams to extend longitudinally thereof, an internal ram of greater length than that of the work to extend longitudinally therethrough, a cutting tool carried by each of said rams to engage the work, means extending transversely of said rams beyond the end of the work and connecting said rams for simultaneous movement, a shaft extending transversely of said rams, gears on said shaft, said rams of said pair being formed with rack teeth to be engaged by said gears, and means for rotating said shaft.

15. In a machine for removing the flash from an electrically welded seam of tubular work of limited diameter and extended length, the combination of a pair of horizontally disposed longitudinally movable rams, cutting tools carried by said rams, said lower of said rams being formed with a transverse opening adjacent said tool carried thereby to permit the escape of chips removed from the work, means for supporting and holding the work in a horizontal position between said rams, an internal ram reciprocable longitudinally within the work and having a head, tools carried by the head of said internal ram for removing internal flash from said work, said head being formed with a transverse opening adjacent said tools on said head to receive chips removed by said tools, and means for simultaneously reciprocating all of said rams.

HENRY E. MORTON.